June 4, 1968 H. M. ERICKS 3,387,127
CLEARANCE SAFETY REFLECTOR RING
Filed Oct. 21, 1965
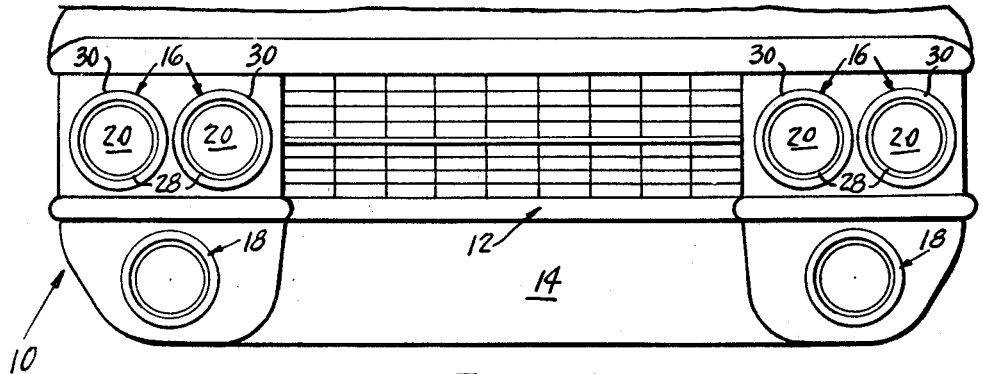
FIG. 1
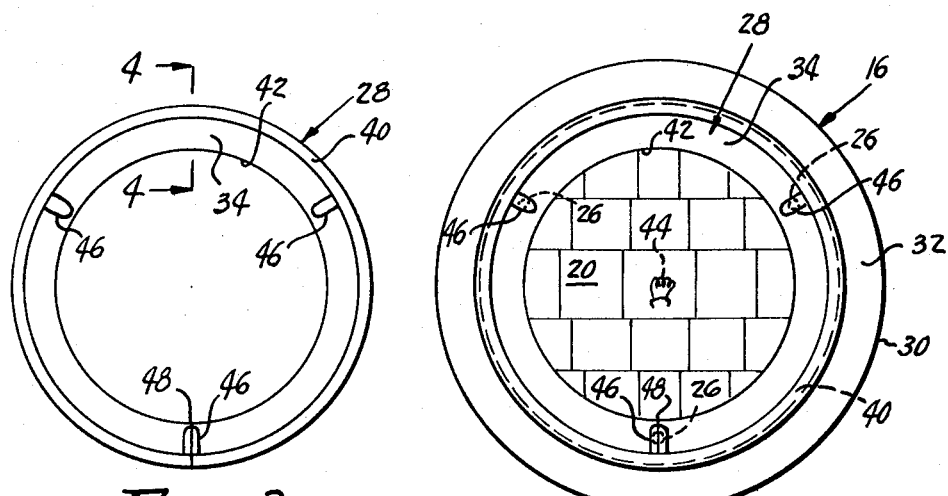
FIG. 3     FIG. 2
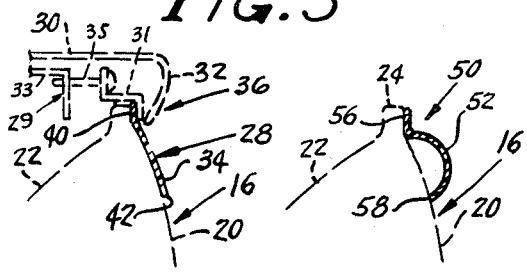
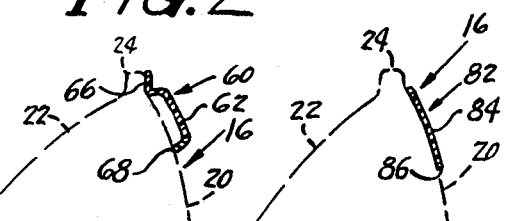
FIG. 4   FIG. 5   FIG. 6   FIG. 8
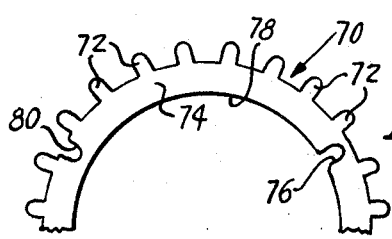
FIG. 7
INVENTOR.
HERBERT M. ERICKS
BY *Kimmel, Crowell & Weaver*
ATTORNEYS.

United States Patent Office 3,387,127
Patented June 4, 1968

3,387,127
CLEARANCE SAFETY REFLECTOR RING
Herbert M. Ericks, 545 Bryan Road,
Ottumwa, Iowa 52501
Filed Oct. 21, 1965, Ser. No. 499,508
10 Claims. (Cl. 240—41)

ABSTRACT OF THE DISCLOSURE

A vehicle lighting system incorporating means with the headlight lenses of a first vehicle to reflect the light rays of a second or oncoming vehicle from the reflecting means of a burned-out headlight on the first vehicle in order to enable the operator of the second vehicle to judge reasonably the lateral width of the first vehicle.

Specification

This invention relates to a reflector ring mounted on a vehicle headlight such that when the headlamp is inoperative during periods of darkness, light projected by an oncoming vehicle will be reflected warning the driver of the oncoming vehicle of the lateral limits of the vehicle equipped with the device of the instant invention.

Reflective devices have been proposed by the prior art for positioning adjacent the headlamp of an automobile or the like to indicate the presence and location of inoperative headlamps thereby rendering safer the approach of vehicles traveling in opposite directions during periods of darkness. A common disadvantage of the reflecting devices of the prior art is that they are large, bulky and conspicuously mounted thereby detracting from the style and beauty of the automobile. Another disadvantage of the prior art devices is that they have utilized reflecting buttons which may be readily dislodged, stolen or other wise inadvertently lost thus diminishing their value.

It is a primary object of the instant invention to provide a headlamp equipped with a reflector ring which acts to warn, during periods of darkness, an oncoming driver of the lateral limits of the vehicle equipped with the instant invention.

Another object of the instant invention is to provide a clearance safety reflector ring which is inconspicuously mounted on the headlamp of a vehicle in order to provide the reflective characteristics mentioned above and yet conserve and maintain the beauty and grace of the automobile.

Still another object of the instant invention is to provide a clearance safety reflector ring which may be easily and readily attached to a vehicle type headlamp during or after manufacture.

A further object of the instant invention is to provide a clearance safety reflector ring of the character described which is inexpensive to manufacture, simple to install and which tenaciously clings to its installed position.

A still further object of the instant invention is to provide a clearance safety reflector ring adhesively secured to the periphery of a light transmitting lens of a vehicle headlamp.

Still another object of the instant invention is to provide a clearance safety reflector ring clamped onto a vehicle headlamp for the purposes described.

A further object of the instant invention is to provide a clearance safety reflector ring for attachment to a headlamp having a plurality of forwardly extending adjustment protuberances.

Still other objects and advantages of the instant invention, as well as the invention itself, reside in the combinations of elements, arrangements of parts and features of construction and operation, all as will be more fully explained hereinafter and disclosed in the accompanying drawing wherein there are shown preferred embodiments of this inventive concept.

In the drawing:

FIGURE 1 is a front elevational view of an automobile front showing a central grill laterally bounded by a plurality of forwardly shining headlights and parking lights;

FIGURE 2 is an enlarged front elevational view of a vehicle headlight equipped with a reflector ring of the instant invention;

FIGURE 3 is an enlarged front elevational view of a clearance safety reflector ring of the instant invention;

FIGURE 4 is a cross-sectional view taken substantially along line 4—4 of FIGURE 3 illustrating one embodiment of the reflecting configuration of the instant invention showing in dashed lines the headlight and headlight rim and clamp;

FIGURE 5 is a cross-sectional view similar to FIGURE 4 of another form of reflecting strip of the instant invention;

FIGURE 6 is still another cross-sectional view similar to FIGURE 4 illustrating still another form of reflecting means of the instant invention;

FIGURE 7 is a partial front elevational view of another form of connecting means which may be utilized to secure the clearance safety rings of FIGURES 3 to 6 inclusive to a headlight; and FIGURE 8 is a cross-sectional view similar to that of FIGURES 4 to 6 inclusive illustrating an adhesively mounted reflecting strip.

Referring now to the drawing in detail, wherein like reference characters designate like elements throughout the several views thereof, there is indicated generally at 10 an automobile front having a decorative grill shown generally at 12 overlying a bumper 14 with a pair of headlamp assemblies shown generally at 16 residing on each side of grill 12 overlying a parking light assembly indicated generally at 18.

Each of headlamp assemblies 16 includes a convex transparent light-transmitting section or lens 20 joined with a concave light-reflecting section 22 forming a shoulder 24. As is customary in the manufacture of headlamps, a plurality of adjustment protuberances 26 extend forwardly from lens 20 away from reflecting section 22. A clearance safety reflector ring designated generally at 28 is mounted on light-transmitting lens 20 by a conventional adjustable mounting means shown generally at 29 between headlight 16 and a headlight rim shown generally at 36 having a forwardly extending portion 30 forming a curved lip 32 forwardly of shoulder 24, as may be seen most clearly in FIGURES 2 and 4.

Reflector ring 28 includes a substantially continuous convex strip of reflective material 34 closely adjacent peripheral marginal edge of the lens section 20 and an outwardly turned substantially straight ledge 40 overlying the front of shoulder 24. Reflective strip 34 is illustrated in FIGURES 2 to 4 inclusive as being circular forming an interior opening 42 allowing light emitting from a light source 44, such as a coiled high resistance wire, within the compartment formed by a light-transmitting section 20 and light-reflecting section 22 to pass through section 20 and reflector ring 28.

Reflector ring 28 may be made of a slightly resilient reflector material, such as a reflectorized metal, plastic, rubber or the like, such that ledge 40 may be grasped by a Z-shaped connector 31 which is adjustably attached to an L-shaped brace 33 by a threaded screw 35. As additional features, reflector ring 28 may be equipped with a plurality of outwardly extending bulges 46 forming indentations on the inner surface of reflective strip 34 for receiving alignment protuberances 26 as may be seen in FIGURE 2. Reflector ring 28 is preferably severed or cut to provide a groove 48 positioned at the nadir of headlamp 16 providing a means for the drainage of water or other liquids trapped by the upwardly extending edge of opening 42.

In the illustration of the utilization of reflector ring 28, it is assumed that headlight assembly 16 of the vehicle of FIGURE 1 is such that both headlights on the right-hand side thereof are inoperative with only one headlight on the lefthand side thereof being operable. When another vehicle approaches the vehicle of FIGURE 1 during hours of darkness, the light emitted from the headlights of the oncoming vehicle will strike reflective strip 34 of the rightmost headlights of FIGURE 1 providing an angular area of light visible to the oncoming driver. It will be seen, therefore, that the oncoming driver will be apprised of the lateral extent of the vehicle equipped with instant invention and will not be surprised by the single operative headlight into believing that a motorcycle is approaching. It will thus be seen that reflector ring 28 of the instant invention will contribute significantly to visibility of parked or oncoming vehicles having one or more temporarily or permanently inoperable headlights.

It will be noted that the substantially continuous nature of reflective strip 34 will provide a much larger reflective area than a plurality of individual buttons while the appearance of the automobile is not diminished because of the placement thereof around the periphery of light-transmitting section 20. In addition to the increased reflective surface provided by the substantially continuous nature of strip 34, it should be pointed out that the convex nature thereof also tends to increase the total reflective surface area. Surprisingly, it has been found that the light emitting from headlamp 16 is not appreciably diminished by the positioning of reflector ring 28 thereon. In the event that the government regulatory agencies object to the positioning of a light-reflecting members such as those described on the periphery of light-transmitting section 20, it is believed that the use of a reflective substance, such as paint or a mirror-type backing, which transmits light in one direction and reflects light from the opposite direction will obviate any such objections.

Referring now to FIGURE 5, there is indicated generally at 50 another form of clearance safety reflector ring of the instant invention having a transversely arcuate convex reflective surface 52 extending about the peripheral marginal edge of the lens 20 clipped to the front of shoulder 24 by a connecting means (not shown) similar to that of FIGURE 4 which cooperates with an outwardly extending ledge 56 integral with reflective surface 52. Reflective surface 52 is illustrated as a segment of a toroidal structure having an inner edge 58 forming an opening through which light may pass thus providing a substantially increased reflective area as compared to reflective strip 34 of FIGURE 4 thereby increasing the quantity of reflected light visible to an oncoming driver. It should be apparent that outwardly extending ledge 56 and inner edge 58 cooperate with shoulder 24, light-transmitting section 20 and a connecting means to insure the secure placement of reflector ring 50 on headlamp 16.

Referring now to FIGURE 6, still another form of clearance safety reflector ring is shown generally at 60 providing a transversely or radially arcuate convex reflective surface 62 joined with an outwardly extending ledge 66 for securement to shoulder 24 of headlamp 16 as previously mentioned. Since reflector ring 60 may be made of a resilient material, outwardly extending ledge 66 may be grasped and moved under a bracket (not shown) such that outwardly extending ledge 66 cooperates with an inner edge 68 to secure ring 60 to headlight 16. As with the previously enumerated embodiments, inner edge 68 forms an inner opening through which light may pass.

It should be noted that each of ledges 40, 56, 66 forms a substantially continuous lip residing in front of shoulder 24 cooperating to secure reflector rings 28, 50, 60 to lamp 16. In the alternative, any of the aforementioned reflector rings may be equipped with a connecting means shown generally at 70 in FIGURE 7. Connecting means 70 includes a plurality of spaced apart ears 72 connected to a reflective strip 74 with ears 72 being capable of undergoing deformation to reside in front of shoulder 24 of headlight 16. In addition to connecting means 70, FIGURE 7 illustrates a feature utilizable on all of the embodiments of the instant invention. In lieu of indentation forming bulges 46 for receiving adjustment protuberances 26, a plurality of cutouts 76 may be formed in reflective strip 74 communicating with an opening 78 thereof for receiving protuberances 26. Alternatively, a plurality of cutouts 80 may be formed in reflective strip 74 communicating with the exterior edge thereof for similar purposes.

Referring now to FIGURE 8, another form of clearance safety reflector ring is indicated generally at 82 including a closed reflective strip 84 forming an inner opening 85 to allow light to pass therethrough as previously mentioned. Reflective strip 84 is adhesively secured to lens 20 closely adjacent the periphery thereof and may be provided with suitable cutouts for receiving protuberances 26 as previously mentioned or strip 84 may overlie protuberances 26.

It should be apparent that any of clearance safety reflector rings 28, 50, 60, 82 may be assembled with a vehicle headlight during manufacture or may be assembled upon the installation of headlight 16 onto an automobile.

It is now seen that there is herein provided an improved safety reflector ring having all of the objects of the instant invention and others, including many advantages of great practical utility and commercial importance.

Since many modifications may be made of the instant inventive concept, and since many modifications may be made of the embodiments hereinbefore shown and described, it is to be understood that the foregoing is to be interpreted merely as illustrative and not in a limiting sense.

I claim:

1. A vehicle headlamp having a transparent light-transmitting lens forming a periphery, a light-reflecting section joined to the light transmitting lens in spaced relation relative thereto to form a compartment therebetween, and a light producing source within the compartment formed of the light-transmitting lens and the light-reflecting section, the improvement comprising a substantially continuous light-reflective strip seucred over at least a portion of the peripheral marginal edge of the light transmitting lens and lying substantially within the confines thereof, and said strip reflecting light impinging thereon solely derived externally of said headlamp, and wherein the only reflected light from said strip is in a direction away from said light-reflecting section of said headlamp, at least one protuberance formed on said light-transmitting lens and extending away from adjacent the periphery thereof, and means on said reflective strip for accommodating said protuberance.

2. The structure of claim 1 wherein the accommodating means includes a cutout formed by the reflective strip receiving the protuberance.

3. The structure of claim 1 wherein the accommodating means includes a bulge forming an indentation between the reflective surface and the light-transmitting lens receiving said protuberance.

4. The structure of claim 1 wherein the reflective strip is adhesively secured to and lies wholly within the light-transmitting lens.

5. A vehicle headlamp having a transparent light-transmitting lens forming a periphery, a light-reflecting section joined to the light-transmitting lens in spaced relation relative thereto to form a compartment therebetween, and a light-producing source within the compartment formed by the light transmitting lens and the light-reflecting section, the improvement comprising a substantially continuous light-reflecting strip secured over at least a portion of the peripheral marginal edge of the light-transmitting lens and lying substantially within the confines thereof, and said strip reflecting light impinging thereon solely derived externally of said headlamp, and wherein the only reflected light from said strip is in a direction away from said light reflecting section of said headlamp, said headlamp including a peripheral shoulder adjacent the junction of the light-transmitting lens and the light-reflecting section, said reflective strip forming an arcuately convex reflecting surface overlying the shoulder, and means clamping said reflective strip to said shoulder on the side facing said light transmitting lens.

6. The structure of claim 5 wherein the arcuately convex reflecting surface is a segment of a toroid.

7. The structure of claim 5 wherein the arcuately convex reflecting surface is flush with said reflecting surface.

8. A vehicle headlamp having a transparent light-transmitting lens forming a periphery, a light-reflecting section joined to the light-transmitting lens in spaced relation relative thereto to form a compartment therebetween and a light-producing source within the compartment formed by the light-transmitting lens and the light-reflecting section, the improvement comprising a substantially continuous light reflective strip secured over at least a portion of the peripheral marginal edge of the light-transmitting lens and lying substantially within the confines thereof, and said strip reflecting light impinging thereon solely derived externally of said headlamp, and wherein the only reflected light from said strip is in a direction away from said light-reflecting section of said headlamp, said headlamp having a lowermost point, and said continuous strip having adjacent the lowermost point a groove for providing egress for water accumulated under said continuous strip.

9. A vehicle headlamp comprising
a transparent light-transmitting lens forming a periphery;
a light-reflecting section, joined to the light-transmitting lens forming a compartment therebetween;
a light-producing source within the compartment;
means affixed to the periphery of the light-transmitting lens for adjusting the orientation of the headlamp on a vehicle, the adjusting means including a reverted end overlying the periphery and a segment extending away from the periphery in the general direction of the light-reflecting section;
the improvement comprising
a light-reflective strip secured about at least a portion of the periphery of the light-transmitting lens having an outwardly turned ledge at the outer marginal edge thereof, the ledge being sandwiched between the reverted end of the adjusting means and the light-transmitting lens;
said light-reflective strip reflecting therefrom light impinging thereon solely derived externally of said headlamp, the reflected light being in a direction away from said light-reflecting section.

10. A vehicle headlamp comprising
a transparent light-transmitting lens forming a periphery;
a light-reflecting section, joined to the light-transmitting lens forming a compartment therebetween;
a light-producing source within the compartment;
means affixed to the periphery of the light-transmitting lens for adjusting the orientation of the headlamp on a vehicle, the adjusting means including a reverted end overlying the periphery and a segment extending away from the periphery in the general direction of the light-reflecting section;
the improvement comprising
a reflective strip secured about at least a portion of the periphery of the light-transmitting lens having an outwardly turned ledge at the outer marginal edge thereof, the ledge and the adjusting means cooperating to retain the strip in position;
said light-reflective strip reflecting therefrom light impinging thereon solely derived externally of said headlamp, the reflected light being in a direction away from said light-reflecting section.

References Cited
UNITED STATES PATENTS

| | | | |
|---|---|---|---|
| 1,473,400 | 11/1923 | Dunn | 240—41.5 |
| 1,847,134 | 3/1932 | Nikonow | 240—8.3 |
| 2,082,658 | 6/1937 | Sawer | 240—8.3 |
| 2,398,970 | 4/1946 | Singer | 240—41 |
| 2,911,522 | 11/1959 | Mears | 240—7.1 X |
| 3,065,340 | 11/1962 | Mead et al. | 240—41.5 |
| 3,283,143 | 11/1966 | Gosnell | 240—46.57 |

NORTON ANSHER, *Primary Examiner.*

R. M. SHEER, W. M. FRYE, *Assistant Examiners.*